United States Patent [19]

Wadhwani et al.

[11] 3,925,763

[45] Dec. 9, 1975

[54] SECURITY SYSTEM

[76] Inventors: Romesh Tekchand Wadhwani, 5559 Beeler St.; Krishnahadi Sikun Pribadi, 120 Westland Drive, both of Pittsburgh, Pa. 15217

[22] Filed: Sept. 13, 1973

[21] Appl. No.: 397,158

[52] U.S. Cl. .............................. 340/164 R; 340/310

[51] Int. Cl.$^2$ .................... H04B 13/02; H04Q 11/00

[58] Field of Search........ 340/150, 152, 164 R, 310, 340/216; 179/5

[56] References Cited

UNITED STATES PATENTS

| | | | |
|---|---|---|---|
| 3,593,293 | 7/1971 | Rorholt | 340/152 R |
| 3,689,888 | 9/1972 | Woolton | 340/164 R |
| 3,694,579 | 9/1972 | McMurray | 179/5 R |
| 3,702,460 | 11/1972 | Blose | 340/150 |
| 3,713,125 | 1/1973 | Miller | 340/224 R |
| 3,733,586 | 5/1973 | Lusk et al. | 340/310 R |
| 3,810,096 | 5/1974 | Kabat et al. | 340/147 R |

*Primary Examiner*—Donald J. Yusko
*Attorney, Agent, or Firm*—Buell, Blenko & Ziesenheim

[57] ABSTRACT

A security alarm system for selectively detecting and signalling abnormal or emergency conditions, such as robbery, assault, fire, smoke, burglary, medical emergencies, etc. in a home, apartment, institution, plant or other place of business via digitally-coded messages, to a central data station. This central station monitors or services a plurality of areas to be guarded or protected and manually or automatically directs or dispatches appropriate aid to the location or area from which the signal originated. Essentially, the system comprises sensors responsive to the occurrence of abnormal or emergency conditions which transmit digitally-coded messages including information on self-identification and the nature of the emergency to a line converter. The line converter decodes the signal and then adds on information identifying its own location (e.g., room number, apartment number), and synthesizes a combined digital message which is then transmitted along power lines, such as the 110 Volt or 220 Volt AC power circuits commonly used in homes, apartments, businesses and institutions, at transmission frequencies and voltages substantially different from the power frequency and voltage, to a master controller. The master controller receives and decodes the digitally-coded messages transmitted by the line converters and adds further location information (e.g., street address) and synthesizes an appropriate digitally-coded message which it communicates to one or more central stations using one or more of a variety of transmission media: telephone line, coaxial cable, radio and external power line. Each central station services a plurality of master controllers in different protected areas.

10 Claims, 24 Drawing Figures

DATA TRANSMITTED BY THE DIGITAL PROCESSOR OF THE LINE CONVERTER

LINE CONVERTER

LINE CONVERTER

LINE CONVERTER

DIGITAL PROCESSOR 52

SIMPLIFIED LINE CONVERTOR

CENTRAL STATION

MASTER CONTROLLER / RECEIVER

SECURITY SYSTEM

Present day trends toward massed housing in communities and high-rise apartment complexes as well as wide spread changes in socio-economic conditions affecting the aged, infirm, or sick have accentuated the desirability, need and importance of effective security systems capable of effecting an alarm and/or a response to a signal by police, fire bureau, medical or ambulance service to provide aid and assistance to persons involved in an emergency situation.

Similarly, there is an increasing present-day need in institutions, such as schools and hospitals, and in industrial plants, department stores, and other places of business, for security protective systems which provide a prompt response and assistance to meet the emergency requirement of any particular situation, be it robbery, assault, burglary, fire, sickness or injury to persons.

We are aware of prior art patents relating to this subject. For example, U.S. Pat. No. 3,601,540, issued Aug. 24, 1971 discloses a security system useful in the home and in commercial structures whereby to provide warning against impending danger, such as intruders, fire, etc. The patent discloses circuitry whereby the alarm means may include automatic telephone dialing of a predetermined number, such as the nearest fire station or police station, to deliver a voice message. We are also aware of a more recently issued patent, U.S. Pat. No. 3,694,579, dated Sept. 26, 1972, which describes an emergency reporting digital communications system whereby a selectively activated encoder-transmitter communicates data via a computer relay receiver to a data center where an operator reads the computer output and dispatches necessary assistance in response to the particular emergency decoded dispatch.

Both of these patents are limited in their usefulness and are not adapted to provide the necessary scope, reliability and supervision or monitoring required for a security system suited, for example, to a massed housing situation or to an institutional application.

It is an object, therefore, of our invention to provide a security system, involving digital communication networks, whereby a master controller services a large number of locations, such as rooms in a home or institution, or apartments in an apartment complex, and by a reliable communication medium, such as a telephone line, delivers a suitable message to a central station, where personnel are constantly on duty to see to the dispatch of the required assistance to the appropriate location. It is, moreover, an object of our invention to provide automatic supervision by the master controller of the line converters at the various locations and also of the intervening circuitry.

We provide a security system comprising essentially five types of components, comprising (a) sensors actuated manually or responsive to conditions, which initiate transmission of digitally-coded messages to (b) a line converter which adds its own digital code to the digitally-coded data received from the sensors to provide a synthesized digital message communicated via a power line such as the usual 110 or 220 Volt, 60 or 50 cycle, AC house wiring, to a (c) remote input or output device such as a remote intelligence siren, and to a (d) master controller which receives all signals, stores them, processes them, adds its own digital codes, and locally triggers an alarm while communicating via an appropriate communication medium (e.g., telephone line, coaxial cable, radio, external power line) with (e) a remote central station.

The message transmitted by an active sensor includes complete identification of its location and nature of the emergency, thereby inferentially serving to advise the nature of assistance required. The sensors are of the fixed location type activated automatically (as by opening a door or window) or of the mobile type activated voluntarily by the person wearing or carrying the sensor. The counterpart line converter which receives messages from a sensor first stores it and then adds on its own digital code identifying its own location, which may be a specific room in a home, a room in an institution, or a specific apartment within an apartment complex. The digital message transmitted by a line converter is in the form of a coded electrical signal of much lower voltage and much higher frequency than that carried in usual power circuits within the security area, for example, 110 or 220 Volts at 60 or 50 cycles.

We further provide supervisory circuitry which enables a master controller to determine the status of the line converters connected to the power lines, that is, whether any of them have been activated or not, and whether any of the devices are malfunctioning or are disconnected from the power line.

We further provide alternate circuitry wherein the sensors are of various types, such as the direct-wired type, the radio frequency (RF) type or ultrasonic (US) type. The RF and the US types communicate with their counterpart line converters by radio frequency or by ultrasonic waves, respectively.

A preferred embodiment of our invention will be more fully described hereinafter, along with variations thereof, in connection with the accompanying drawings, wherein.

Figure 1:
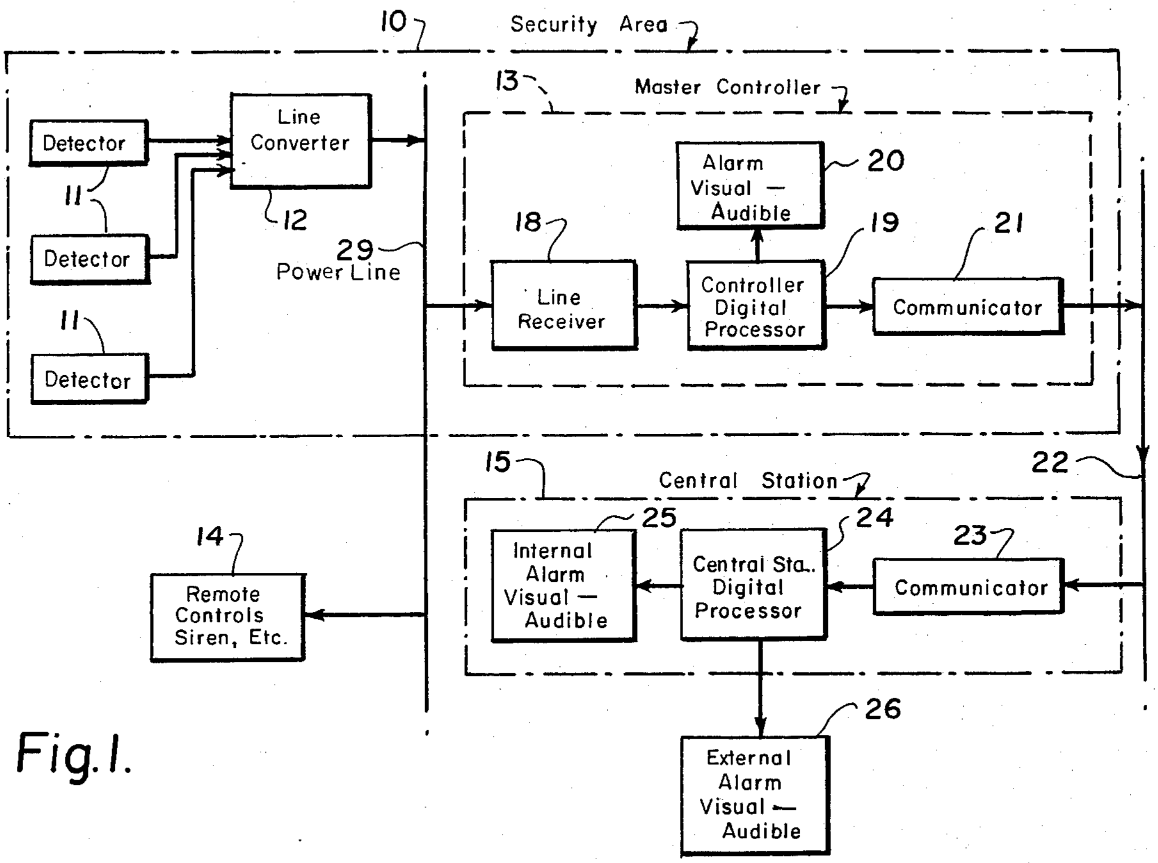
FIG. 1 depicts in diagrammatic block form one form of the security system embodying our invention using a direct-wired link to the line converter.

Referring to the drawings, particularly FIGS. 1–5, there is shown therein a security system embodying our invention, and variations thereof. In FIG. 1, a general security area 10 is shown, which may be a home, an apartment, an institution, an industrial plant, or other place of business. The system comprises a number of components within the security area, namely detectors 11, line converter 12, and master controller 13. Outside the security area are located a remote control device 14 (such as a siren) and a central station 15. If desired, device 14 may be located within the security area.

Figure 2:
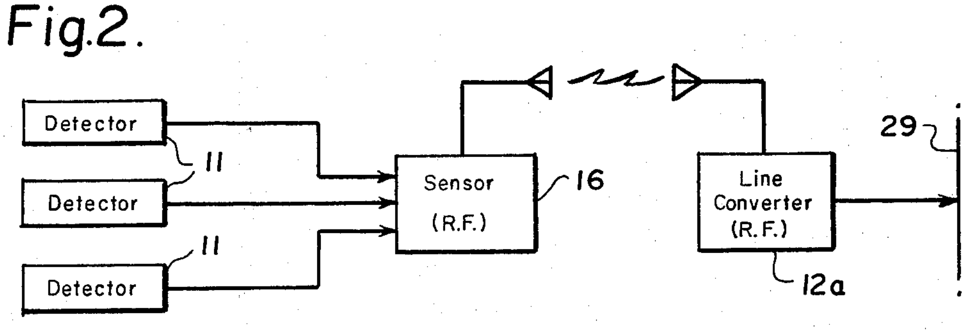
FIG. 2 shows a preferred variation of the embodiment of FIG. 1 employing a radio frequency type sensor.

In FIG. 2, a modification of the embodiment in FIG. 1 comprises a sensor 16 of the radio frequency type which communicates via electromagnetic waves with its counterpart line converter 12*a*. Similarly, in FIG. 3 a further modification of the embodiment of FIG. 1 comprises an ultrasonic sensor 17 which communicates via ultrasonic waves with its counterpart line converter 12*b*.

Referring again to FIG. 1, the master controller 13 comprises a line receiver 18, a controller digital processor 19, an alarm device 20 of the visual and/or audible type, and a communicator 21 for transmitting signals via a communication link 22, which may be a telephone line, coaxial cable, radio-frequency link, high-voltage power line, direct cable or other, to the central station 15.

The central station 15 comprises a communicator 23 for receiving signals from the communicator 21 of the master controller, a central station digital processor 24, an internal alarm device 25 including visual and audible elements, and an external alarm device 26 including visual and audible elements.

Figure 3:
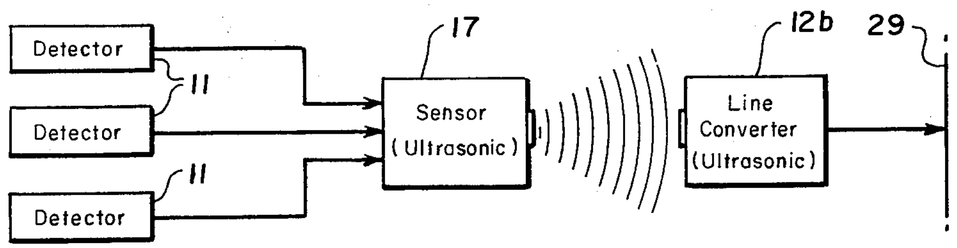
FIG. 3 shows a further variation of the embodiment of FIG. 1 employing an ultrasonic type of sensor.

Referring to FIGS. 1, 2 and 3, the detectors 11 are simply electrical switches such as magnetic switches, micro switches, slide switches, temperature-sensitive switches or smoke-sensitive switches. The switches may be of the normally-open or normally-closed type. They may be actuated manually, triggered by a person in distress, or they may respond automatically to a change in conditions such as the opening of a door, or change in pressure or temperature, smoke and the like. These detectors may either provide an input signal directly (i.e., direct-wire) to the line converter 12, as in FIG. 1, or through the intermediary of a sensor as in FIGS. 2 and 3. As will be explained more fully hereinafter by reference to FIG. 7, the sensor (16, 17) comprises a digital encoder 27 and a transmitter 28 of either the radio frequency (RF) or ultrasonic (US) type for signalling the counterpart line converter. The digitally coded signals originating at a sensor are received and interpreted by the counterpart line converter. As more fully explained later, the line converter 12*a* or 12*b* combines its own digital code with the digitally coded information received from the sensor and then transmits the synthesized digital signal via the power-line system 29 to the line receiver 18 of the master controller.

The coded signal from a sensor identifies the particular sensor activated and the type of emergency (e.g., personal attack, medical emergency, robbery, burglary, fire). The line converter code added to the signal transmitted to the master controller identifies the location and status of the particular line converter activated.

The master controller 13 is one common receiving unit within any security area. The security area may be a home, an apartment complex, an institution such as a school, hospital or prison, or a business or commercial establishment, such as a department store, a warehouse, or a shop.

Figure 4:
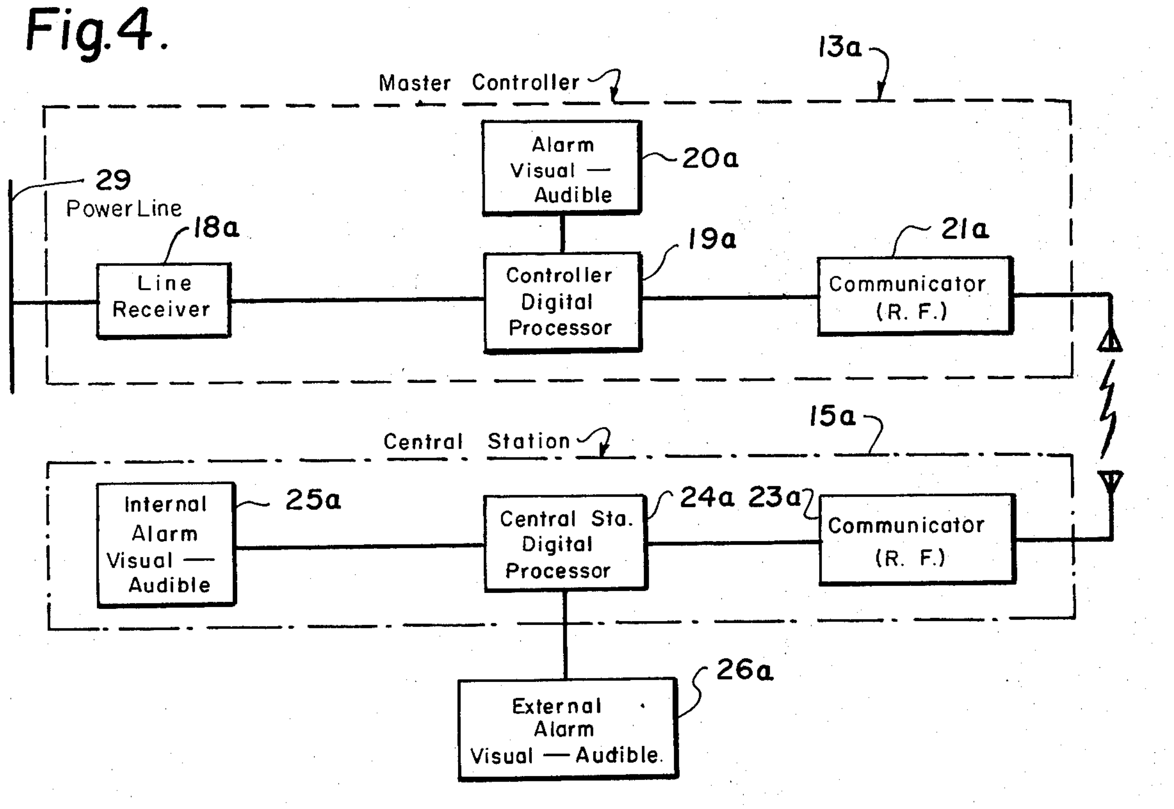
FIG. 4 shows a preferred variation of the embodiment of FIG. 1, wherein the master controller and the central station communicate via radio transmission media.
Figure 5:
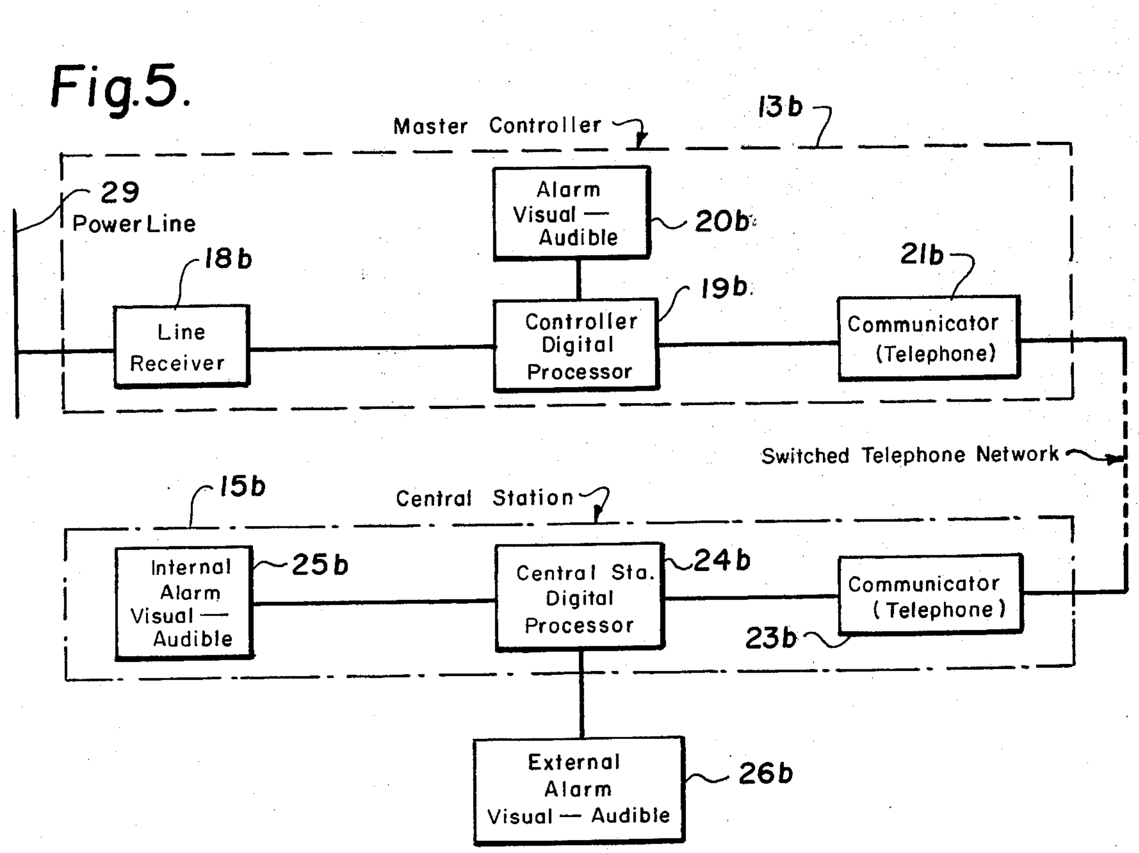
FIG. 5 shows a further variation of the embodiment of FIG. 1, wherein the master controller and the central station communicate via a telephone network or coaxial cable, such as one channel of a television coaxial cable, using either leased voice-grade lines or regular switched lines.

As will be noted from FIGS. 1, 2 and 3, a plurality of detectors 11 in different locations transmit a signal to a common line converter 12, 12*a*, or 12*b*. Also, any number of additional line converters (not shown) may feed into the master controller 13 via the power-line system 29. Additional details concerning the component parts of the sensors 16 and 17 and of the line converters 12, 12*a* and 12*b* will be described later on in connection with FIGS. 7 through 16. As will be explained in more detail later in connection with FIG. 21, the master controller 13 receives all signals from the line converters, stores them, processes them, adds its own digital codes and takes action of two kinds. Locally, it triggers the alarm 20 which gives visual and/or audible indication of the nature of the emergency, its location, and the person or property threatened. Also, the master controller communicates with the remote central station 15 using any one of several communication media of which FIG. 1 shows coaxial cable or direct wire 22, FIG. 4 shows radio, and FIG. 5 shows a telephone network. If desired, a high-voltage external power-line system may be employed also. The master controller 13 sends digitally coded messages to the central station 15 which include the information received from active line converters 12 (or 12*a*, 12*b*) as well as self-identification code providing information as to the location and nature of the emergency and a status message as to the operational and functional status of the various system components.

It will be understood that a single central station 15 services a large number of master controllers. Thus, there may be one central station 15 for an apartment complex in which there is one master controller 13 for each apartment. Alternatively, a single central station 15 may service an entire area or region in which individual security systems are provided for a number of homes or apartment buildings.

Figure 6:
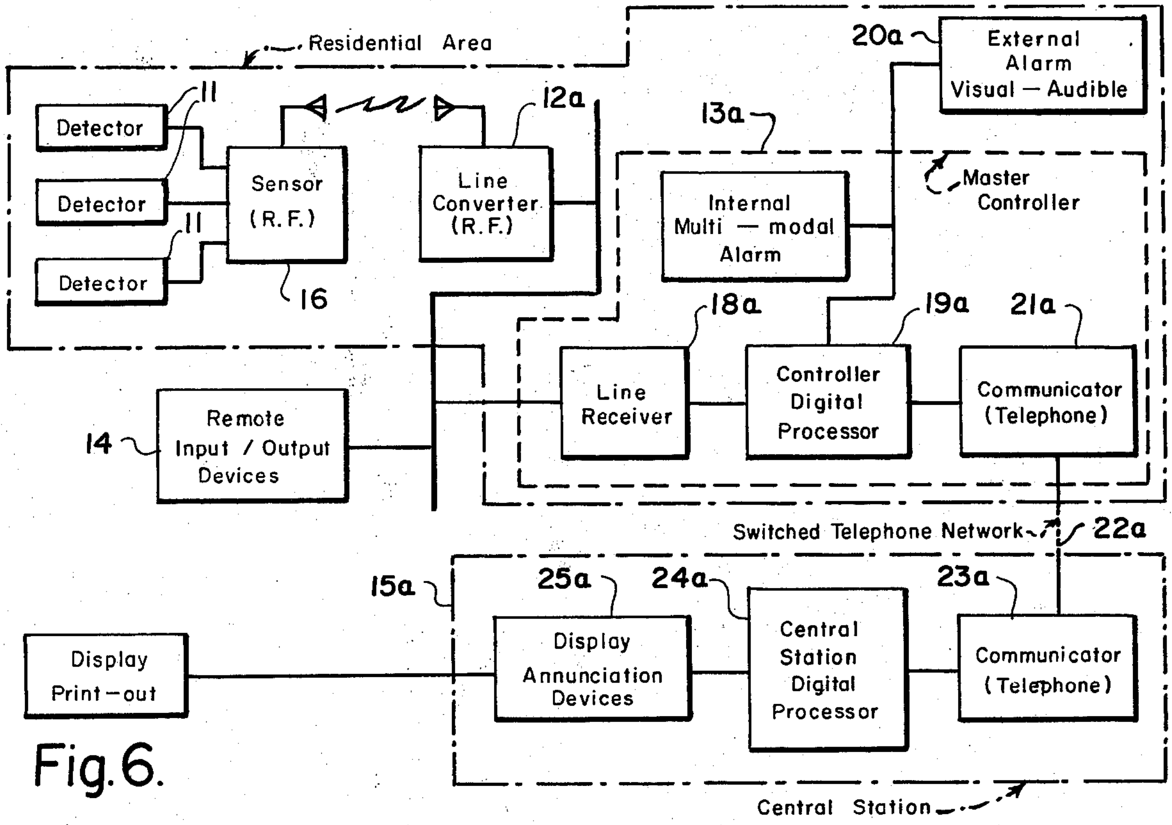
FIG. 6 shows in diagrammatic block form a preferred embodiment of security system for an individual home or apartment.

In FIG. 6 is depicted a security system for a typical home installation. The similarity of components to those of FIG. 1 will be apparent. It will be noted that radio frequency type sensors 16 and line converters 12*a* are employed. If desired, ultrasonic type sensors 17 and line converters 12*b* may be employed, or direct-wire line converters 12. Also, the master controller 13*a* communicates with the central station 15*a* via the switched telephone network 22*a* similar to that of FIG. 5. The communicator 21*a* of the master controller 13*a* in FIG. 6 includes a digital dialer which is pre-programmed to automatically dial the telephone numbers associated with the central station 15*a*. The master controller 13*a* activates a local alarm 20*a* which provides audible/visual alarms with different alarm patterns for different emergencies. This provides immediate local identification of the emergency and information as to the type of assistance required.

It should be understood that the alternate embodiments of security systems shown in FIG. 4 and 5 differ from that shown in FIG. 1 merely in the type of communication medium employed between the master controller and the central station. Accordingly, the master controller, the central station and components thereof in FIGS. 4 and 5 are designated by the same reference numerals, as in FIG. 1 except for the addition of the suffix letter "*a*" and suffix letter "*b*".

Referring now to FIGS. 7–16 inclusive, additional details of the sensors and line converters will be described.

Figure 7:
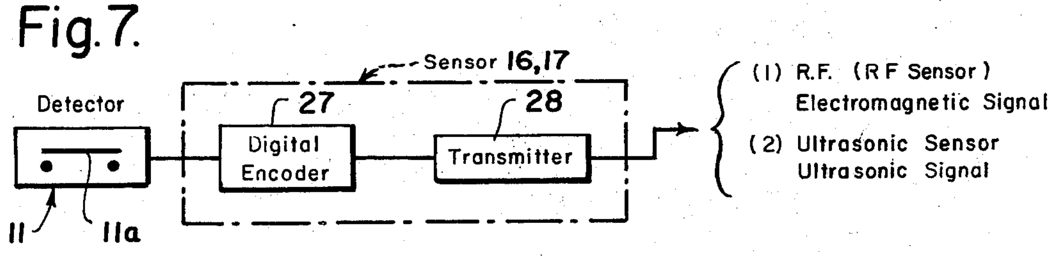
FIG. 7 shows in diagrammatic block form the functional specifics of a sensor, whether of the RF, ultrasonic or direct wire type, including a digital encoder.
Figure 8:
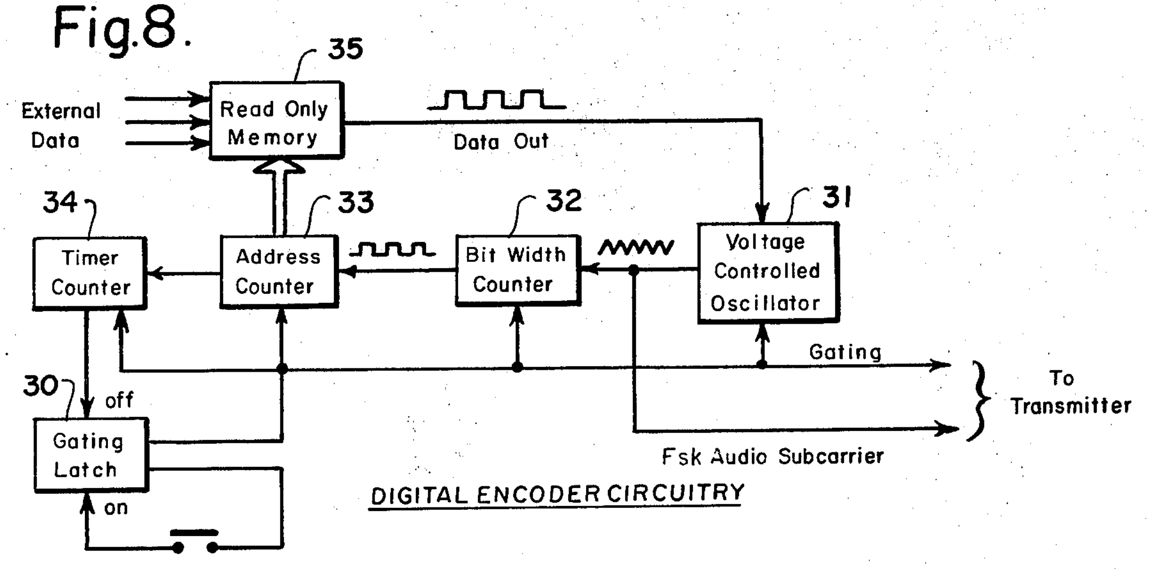
FIG. 8 shows in diagrammatic block form a preferred form of digital encoder for use in the sensor of FIG. 7.

As shown generally in FIG. 7, the signal input to the digital encoder 27 of the sensor is provided by one or more detectors 11, represented by a normally-open electric switch 11*a*, though if desired, a normally-closed switch may be employed. A change in the state of the switch 11*a* may be effected manually or automatically in response to a change of conditions (e.g., pressure, heat, smoke, etc.). The details of one embodiment of the digital encoder 27 are shown in block form in FIG. 8. In this figure, a gating latch 30 stores input information upon sensor actuation and turns on the voltage-controlled oscillator 31, bit width counter 32, address counter 33 and timer counter 34. The voltage-controlled oscillator 31 determines the subcarrier frequency and its frequency is controlled by the data output from the read only-memory element 35. The bit width counter 32 determines the number of waves of subcarrier for one data bit length. A message consists of a fixed number of sequential data bits. The address counter 33 sequentially selects data bits from the read only-memory element 35 or from external data (e.g., type of emergency — depending on the alternative means of actuation). Timer counter 34 determines the number of messages to be transmitted, and upon entering the end of transmission resets the gating latch 30 which in turn resets the entire circuit.

Figure 9:
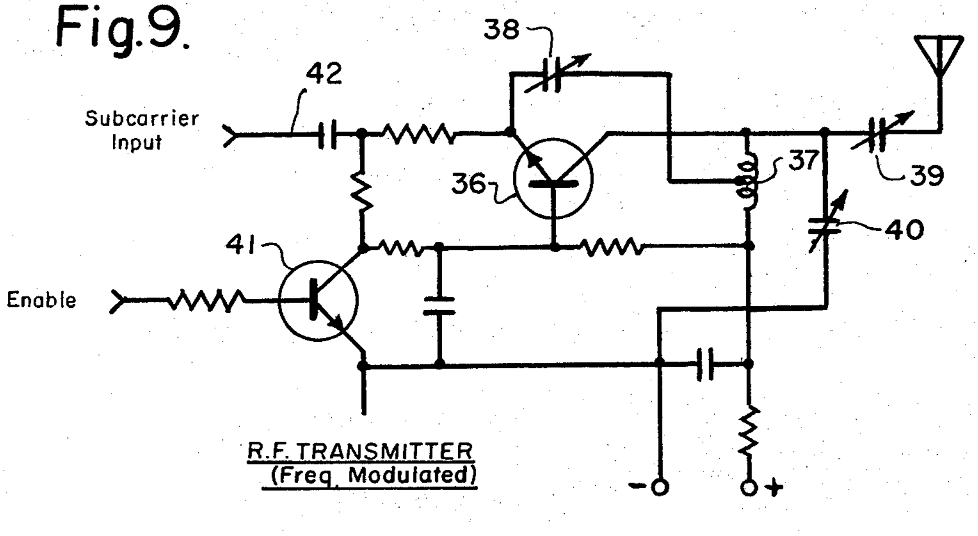
FIG. 9 shows the specific circuitry for a preferred embodiment of the transmitter of the RF sensor type shown in FIG. 7.

FIG. 9 shows the details of one embodiment of the frequency modulated RF transmitter 28 of FIG. 7. In FIG. 9, the transistor 36 and its associated parts form an RF oscillator. Inductor 37 and capacitors 38, 39, and 40 determine the frequency of the oscillations. Current through transistor 36 can be gated on or off by transistor 41 and hence, an enable input to transistor 41 can be used to gate the oscillator on or off. Applying the signal to subcarrier input at 42 modulates the oscillator.

Figure 10:
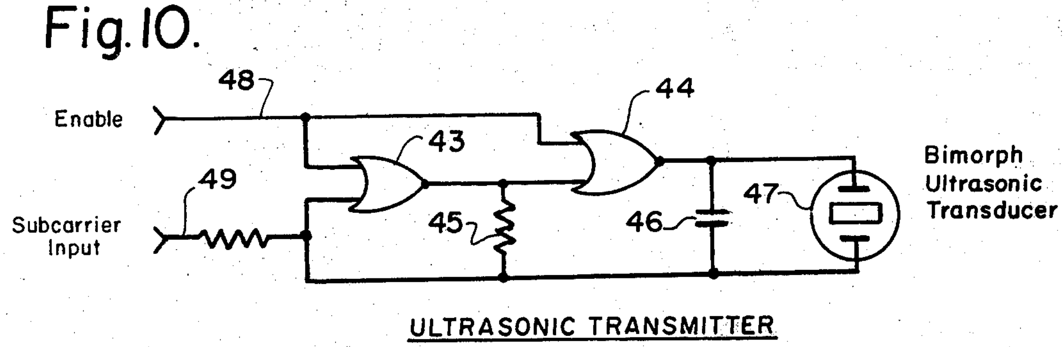
FIG. 10 shows the specific circuitry for a preferred embodiment of the transmitter of the ultrasonic (US) sensor type shown in FIG. 7.

In FIG. 10, the details of an embodiment of the alternative ultrasonic transmitter of FIG. 7 are shown. In this figure, logic gates 43 and 44 form a low power oscillator whose frequency is determined by resistor 45 and capacitor 46 and to a large extent by the natural resonance frequency of the bimorph ultrasonic transducer 47. Driving the enable input 48 low turns the oscillator on, while driving it high turns the oscillator off. A subcarrier signal applied to input 49 both frequency modulates and amplitude modulates the output signal from the transducer 47.

Figure 11:
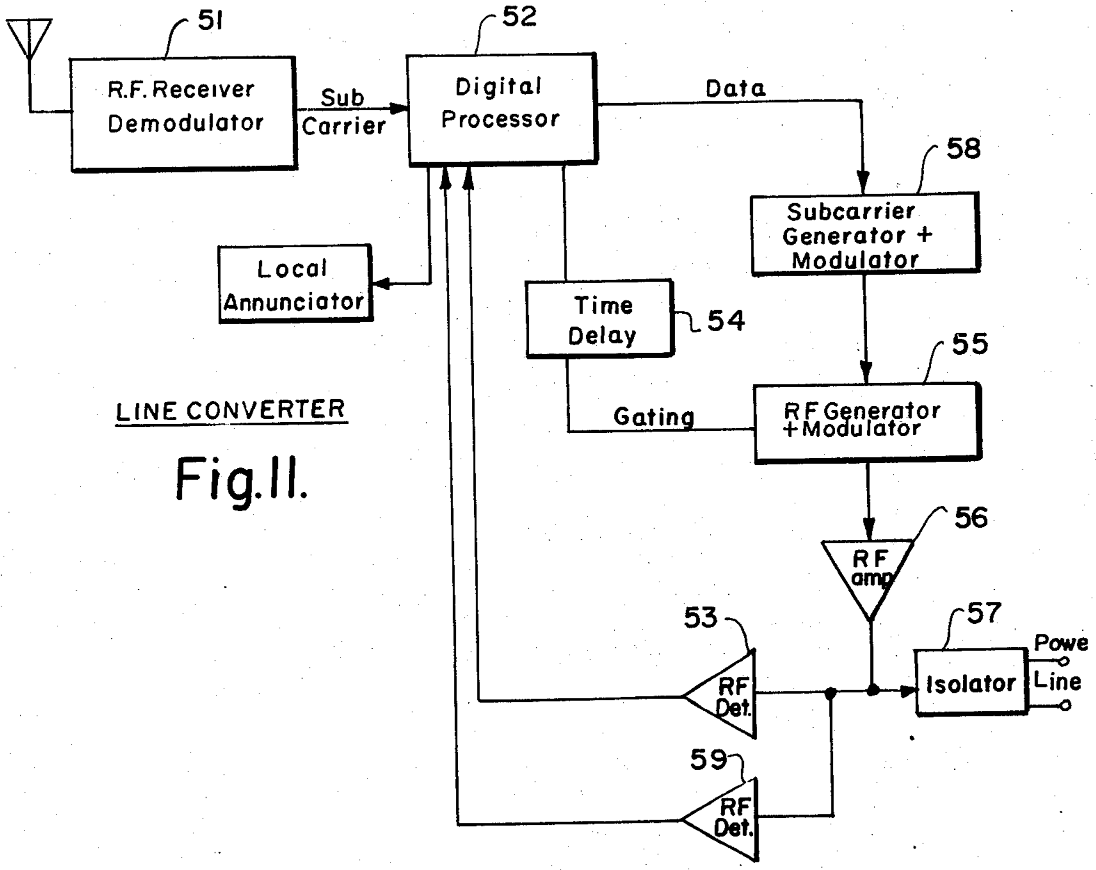
FIG. 11 shows in diagrammatic block form the details of an embodiment of RF line converter in FIG. 2.
Figure 12:
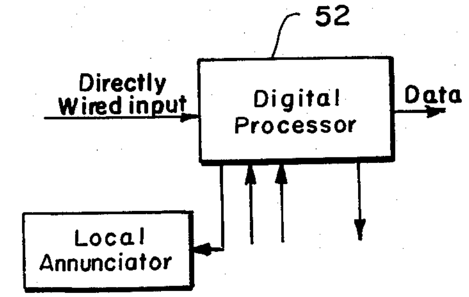
FIG. 12 shows, fragmentally, a line converter (direct wire) variation of the line converter of FIG. 11, suited for directly wired input.
Figure 13:
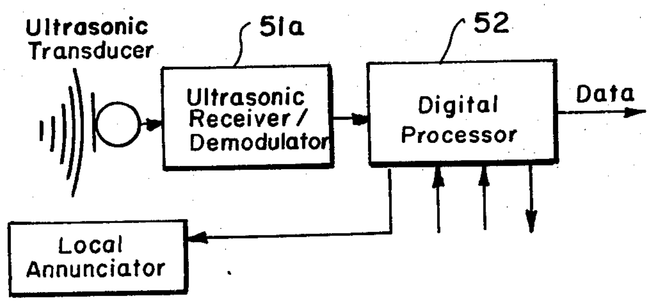
FIG. 13 shows, fragmentally, a variation of FIG. 11, an embodiment of the ultrasonic line converter of FIG. 3, used with a sensor of the ultrasonic type.

FIG. 11 shows in block diagram form a preferred embodiment of the line converter 12*a* of FIG. 2. The signal transmitted by RF sensor 16 is received by an RF receiver-demodulator 51. FIG. 12 shows a block diagram variation of FIG. 11 wherein the input signal is over a direct wire rather than via an RF sensor. FIG. 13 shows a block diagram variation of FIG. 11, wherein an ultrasonic receiver-demodulator 51*a* is provided.

In any event the input signal is transmitted directly or through RF receiver-demodulator 51 or through ultrasonic receiver-demodulator 51*a* to a digital processor 52. The output signal of the receivers 51, 51*a* is an encoded subcarrier. The digital processor 52 decodes this subcarrier and recovers the digital messages received. These messages are stored in a memory, as more fully described in connection with FIG. 14, until they are ready for a retransmission. RF detector 53 detects the presence of transmission from other line converters. If the power line (29) is clear of a transmission signal, time delay element 54 is actuated and after a predetermined time delay, RF generator and modulator 55 is activated sending a signal to the RF amplifier 56 which in turn transmits an RF signal along the power line (29) system. Isolator 57 isolates the power current from the radio-frequency circuits. As shown, the digital data from the digital processor 52 modulates a subcarrier signal generated in the subcarrier generator and modulator 58, and the modulated subcarrier signal then modulates the RF signal generated in the RF generator and modulator 55. The digital message is sent repeatedly and continuously for a predetermined time unless a request for extension (received from the master controller) is sensed by the RF detector 59.

Figure 15:
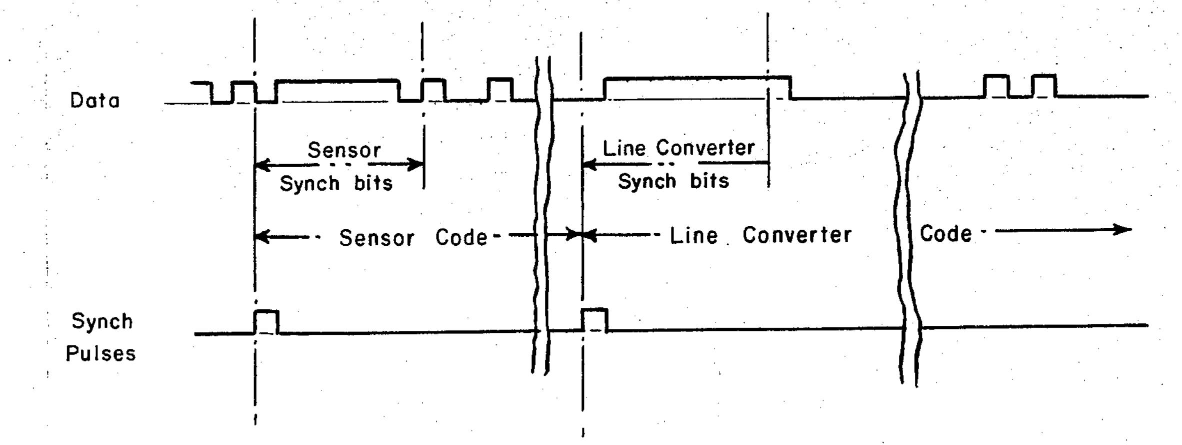
FIG. 15 shows diagrammatically the format of the data transmitted by the digital processor shown in FIG. 14.
Figure 14:
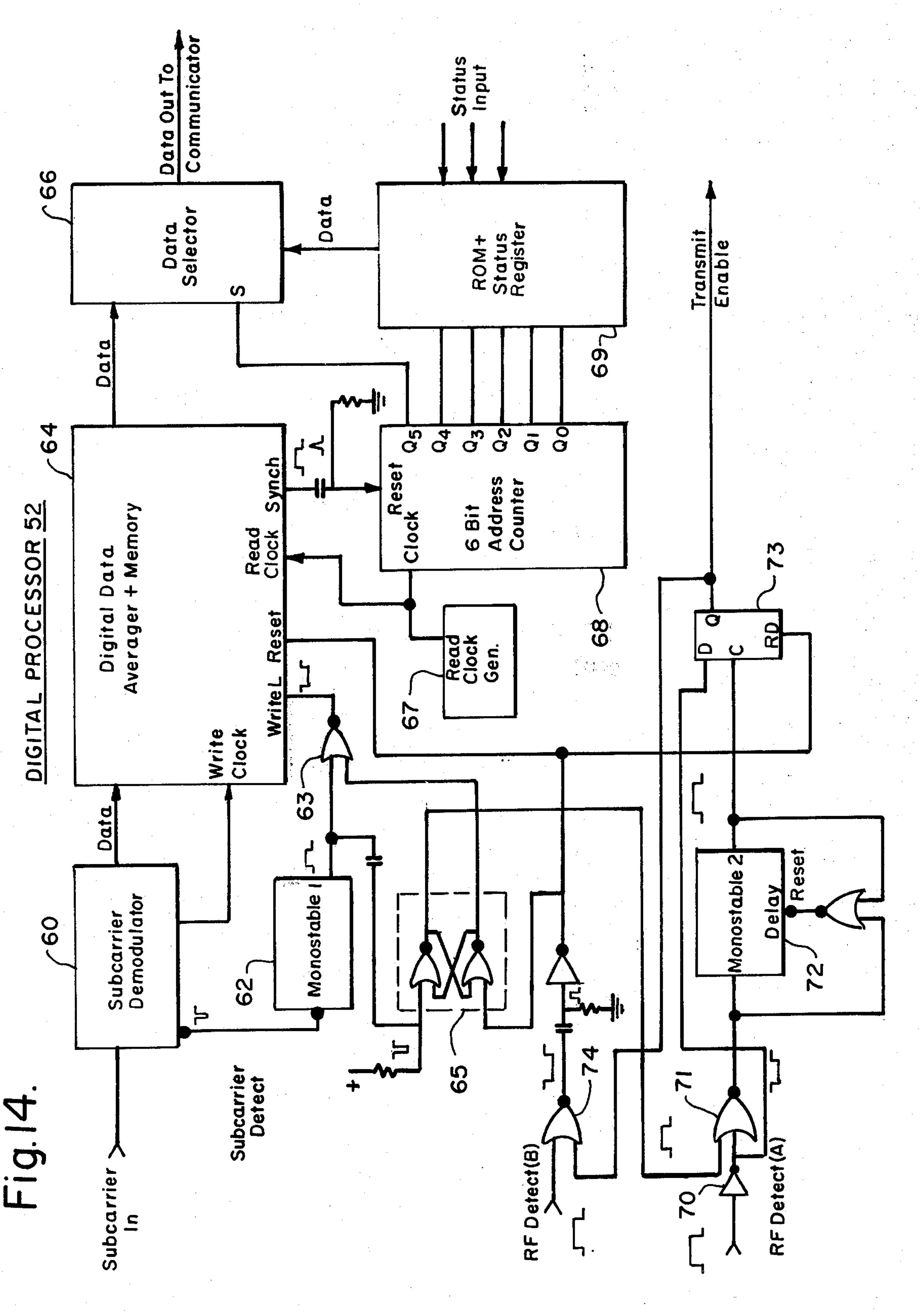
FIG. 14 shows in diagrammatic block form the specific circuitry of an embodiment of the digital processor employed in the line converter embodiment shown in FIG. 11.

FIG. 14 shows, in block diagram form, a more detailed circuitry for the digital processor 52 of FIG. 11. The subcarrier input signal received from the RF demodulator 51 is detected and demodulated by the subcarrier demodulator 60 which gives data output, write clock and subcarrier detect signals. If a subcarrier is detected, monostable element 62 is triggered producing positive voltage output for a period sufficient to trigger gate 63 which in turn puts the digital data averager 64 in "write" mode. During this period, the data produced by the subcarrier demodulator 60 are averaged and stored and partially decoded. At the end of the "write"

period, flip-flop 65 is set and prevents gate 63 from being enabled by subsequent incoming subcarrier signals, thus preserving the data stored in data averager and memory 64 until signal processing is complete. The disabling of gate 63 puts data averager and memory 64 into a "read" mode during which the stored data are transmitted into data selector 66. Simultaneously, the digital data averager 64 also detects for the presence of word synchronizing bits. The speed of the data transmission is determined by output of the read clock generator 67 which is also used to drive the 6-bit address counter 68. This counter selects data from a read only-memory (ROM) and status register 69. Synchronizing pulses from digital data averager and memory 64 puts the data transmission from ROM and status register 69 in the proper sequence relative to the data output from digital data averager and memory 64. Data selector 66 alternately selects either the data output from the digital data averager and memory 64 (sensor/actuator identification and status codes) or from ROM and status register 69 (line relay receiver identification and status codes) to be transmitted out into the communicator. The format of the data transmitted out from the line converter is shown in FIG. 15.

Gate 70 is turned on by the presence of a transmission signal from another line relay receiver. In the absence of such a signal and when flip-flop 65 is activated, gate 71 is enabled and in turn triggers monostable 72 to start a delay pulse. At the end of the time delay, flip-flop 73 is triggered sending an enabling signal to the RF transmitter. At the same time, gate 74 is readied to receive a reset command from the master controller receiver 18. When a reset command is sent, flip-flops 65 and 73 and other modules are reset. If gate 70 detects the presence of a transmission from another line relay receiver, gate 71 is inhibited, preventing the line relay receiver from transmitting until the line is clear of transmission.

Figure 16:
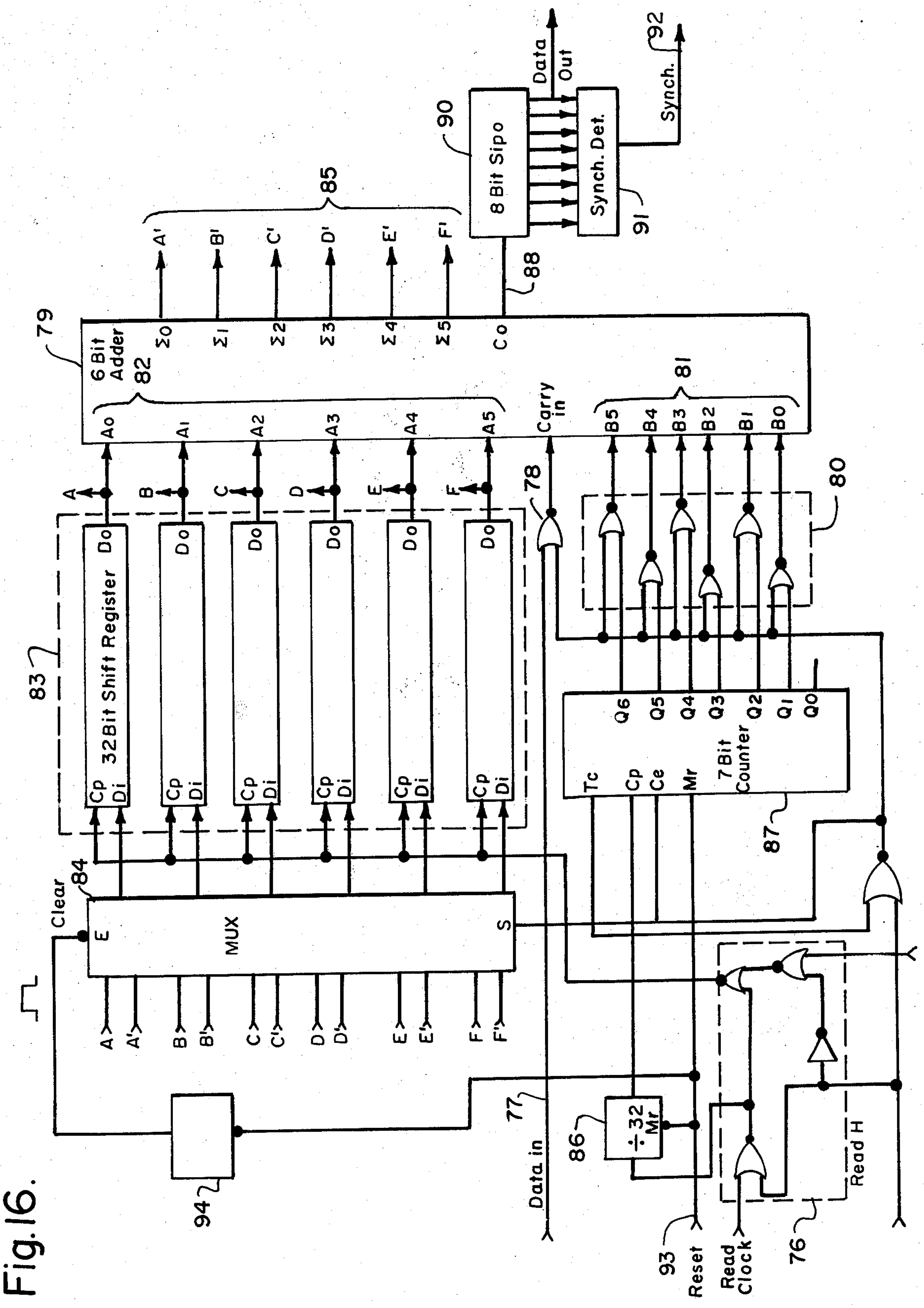
FIG. 16 shows the specific circuitry for the digital data averager and memory section in the digital processor of FIG. 14.

In FIG. 16 is shown an embodiment of the circuitry embodied in the data averager and memory element 64 of the digital processor of FIG. 14, adapted for processing 32-bit word messages. If desired, messages of other lengths may be employed.

During a "write" mode, clock selector 76 selects the write clock to be used for syndromes by processing the digital data. These data enter via terminal 77 through gate 78 into one of the inputs of a 6-bit binary adder 79. At this time, gate array 80 inhibits input into the B-inputs, collectively identified by reference number 81, of the adder 79. All these inputs are set to zero. The A-inputs collectively identified by the reference numbers 82, of adder 79 are connected to the date output of a 6 × 32-bit shift register array 83. Also at this time multiplexer 84 connects the sum outputs 85 of adder 79 into the data inputs of shift register array 83. The adder outputs 85 shows the binary sum of the stored data bits and the incoming data bit from 77. If $i$ is the cell member in each element of the shift register 83, ($i = 0, 1, \ldots 31$) and $N$ is the number of messages (words) written into the memory then the binary value of the sum output 85 will be : $x_i = n_i$, where $n_i$ represents the number of ones of bit $i$ that appear during $N$ number of messages.

Counters 86 and 87 record the number of messages $N$ accepted by the digital averager and memory.

During the read cycle, gate 78 is inhibited, preventing incoming data from being written, and gate array 80 is enabled, connecting the adder inputs 81 to the output of the 7-bit counter 87. The binary number represented by the inputs 81 is 63 − (N/2).

At the same time multiplexer 84 is selected as to feed the outputs of shift register array 83 into its inputs, thereby continuously recirculating the data. The number represented by the outputs 85 and 88, Si, is the sum of the adder inputs 82 and 81 and may be expressed thusly:

$$Si = 63 - N/2 + n_i.$$
If $n_i > N/2$ or $n_i - N/2 \geq 1$, then
$$Si \geq 64.$$

Thus, for a given bit cell, if the number of ones appear more than half of the number of messages (majority = one) then the carry output 88 will be one. On the other hand, if the majority of the bits for a given cell bit is zero, then the carry output 88 will be zero. Therefore, the carry output 88 represents the averaged output of each cell bit over the number of messages received.

The serial to parallel converter 90 gives 8-bit parallel outputs at one time. These are fed into the synch detector 91 which gives a high output at 92 when a bits combination of 0111 1110 is detected. When a reset pulse is applied at 93, counters 86 and 87 are reset and, at the same time, monostable 94 is triggered, giving an output for a period of at least one word (32 bits) long disabling the multiplexer 84 and setting all the inputs of the shift register array 83 to zero. This loads zeros into the shift registers, clearing them within 32 bits time.

Figure 17:
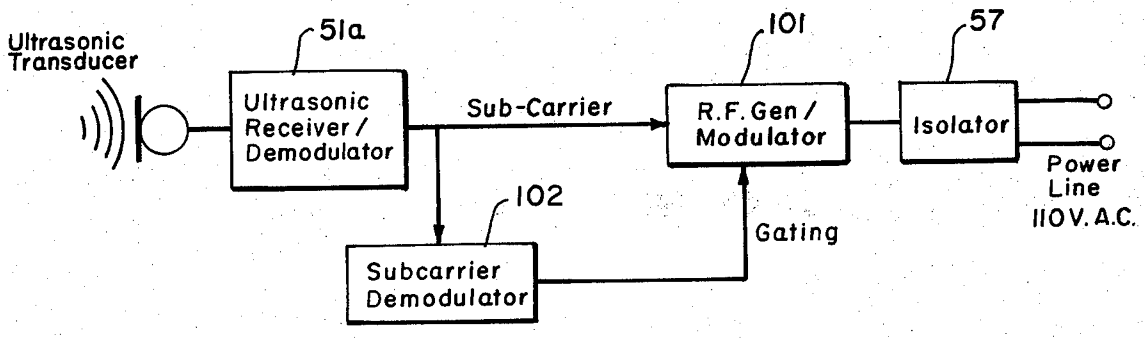
FIG. 17 shows in diagrammatic block form a simplified variation of the line converter of FIG. 11, suited to ultrasonic (US) transmission from the sensor.

FIG. 17 is a block diagram of a simplified form of line converter, which may be utilized in substitution for the more complex embodiment of FIG. 13. in this arrangement, which is of relatively low cost, the digital processor is greatly reduced in size and complexity. It will be seen that the signals received by the ultrasonic receiver-modulator 51*a* are transmitted via a radio frequency generator-modulator 101 and a subcarrier demodulator 102 to the isolator 57 which, in turn, is connected to the power line (e.g., 110 V. AC).

Figure 18:
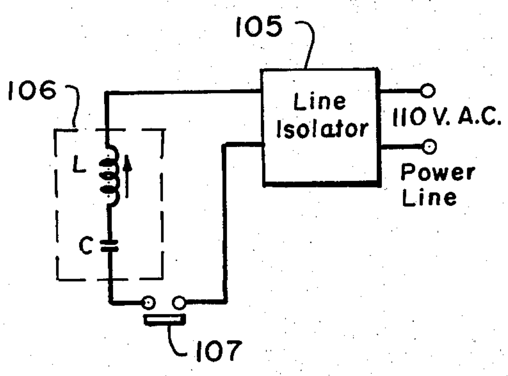
FIGS. 18 and 18A show alternative embodiments of circuitry whereby a line converter (of direct wire, RF, or US types) using the power line external to the security area as a communication medium can be partially supervised by the master controller.
Figure 18A:
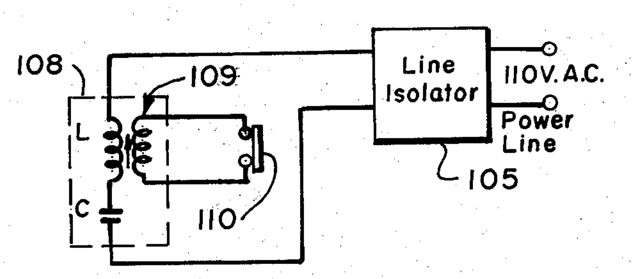

FIGS. 18 and 18A show alternative embodiments of passive circuitry whereby a line converter or any device using the power line as a communication medium may be partially supervised by the master controller 13 to detect a condition where one or more line converters have been actuated. In both embodiments an isolator 106 decouples the power-line voltage (e.g., 110 V. 60 cycle) from the circuitry. In FIG. 18, a frequency-dependent impedance network 106 is connected via the isolator 105 to the power-line system in series with a normally open contact 107 in the converter to be supervised. In FIG. 18A, an impedance network 108 is provided having a transformer type inductance 109, the secondary winding of which is shunted by a normally-closed contact 110 in the device to be supervised. Upon the closure of contact 107 or the opening of contact 110, a low impedance for a narrow frequency band is presented across the power line and this impedance change can be detected by a sensor in the supervisory circuit (hereinafter to be described) of the master controller 13. More than one center frequency can be used to indicate various types of equipment operation indicative of an emergency situation (e.g., burglary, fire, etc.) and combinations of frequencies can be used for digitally coding the line converter. Since more than one line converter, connected to the same line, may be simultaneously actuated without causing interference, it is thus possible for the supervisory circuit of the master controller to indicate that any one or more of such converters have been actuated.

Figure 19:
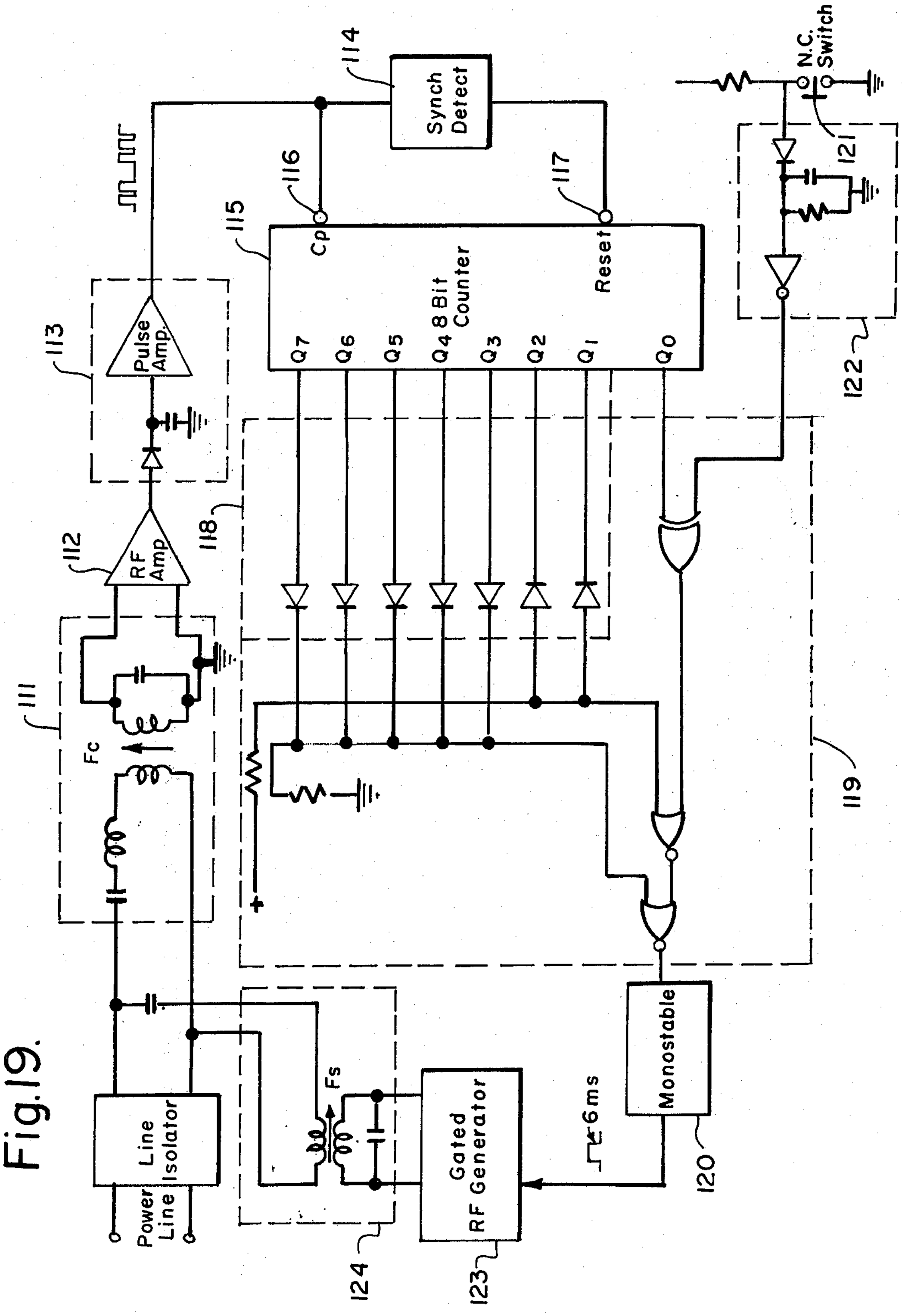
FIG. 19 shows an embodiment of the circuitry whereby full supervision of line converters (of direct wire, RF or US types) may be obtained.

FIG. 19 shows an alternate embodiment of circuitry providing for full supervision of line converters with respect to occurrence of actuation and/or malfunction or some disability such as disconnection from the power line, dead battery, power-line breach and the like. The apparatus of the circuitry shown in FIG. 19 comprises a tuned circuit 111, which with an RF amplifier 112 senses RF signal pulses sent by the master controller supervisory circuit, later to be described, at a center frequency of F*c*. These RF pulses are detected and amplified by a pulse detector 113, giving a series of clock pulses. At certain time intervals, the RF pulses are gated off for 8.3 milliseconds (m.secs) giving synchronizing pulses which are detected by a synchronizing pulse detector 114. The clock pulses are supplied to an 8-bit counter 115 at 116 and serve to increment it, while the synchronizing pulses are applied to the counter 115 at 117 and serve to reset it.

Each line converter is assigned a unique time slot within 128 time slots, and this assignment is programmed into the device by a diode network 118. Each time slot is in turn divided into two halves, one half being used to indicate a normal connected device, and the other half being used to indicate an actuated condition. When a time slot assigned to the device matches the time slot indicated by the counter 115, as detected by timing detector 119, a monostable 120 is triggered on either half of the time slot depending on the condition of the actuator switch 121. Pulse stretcher 122 ensures that the effect of the actuation of switch 121 stays long enough (e.g., 5–10 seconds) to be detected by subsequent scan cycles, (each scan cycle taking about 2 seconds for 128 devices). The output of monostable 120 enables the gated RF generator 123, sending an RF pulse with a center frequency of Fs via the network 124 for about 6 milliseconds (m.secs) to the master controller 13. Failure of the RF generator 123 to send an RF pulse response within the time slot assigned indicates that the device is either disconnected or has malfunctioned.

Figure 20:
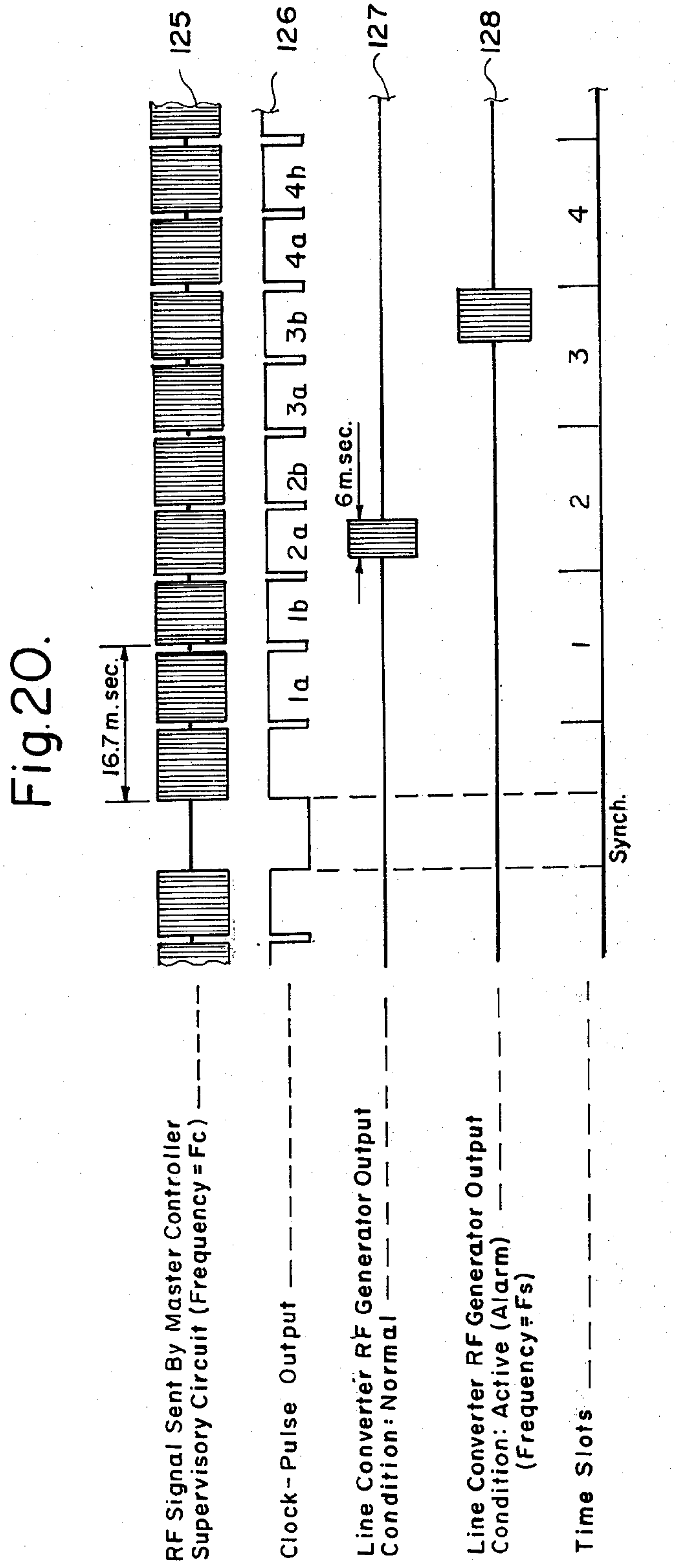
FIG. 20 shows the timing diagram for the RF pulses generated by the supervisory circuit of FIG. 19, in response to RF supervisory signals from the master controller.

FIG. 20 shows the timing diagram for the RF pulses 125 sent by the supervisory circuit of the master controller 13, the clock pulse output 126, RF generator outputs at a normal condition 127, or at an actuated condition 128 with respect to the time slots. While the number of time slots has been selected as 128, any number larger or smaller than 128 may be selected, depending on the number of converters to be supervised, with suitable alteration of circuitry.

Figure 21:
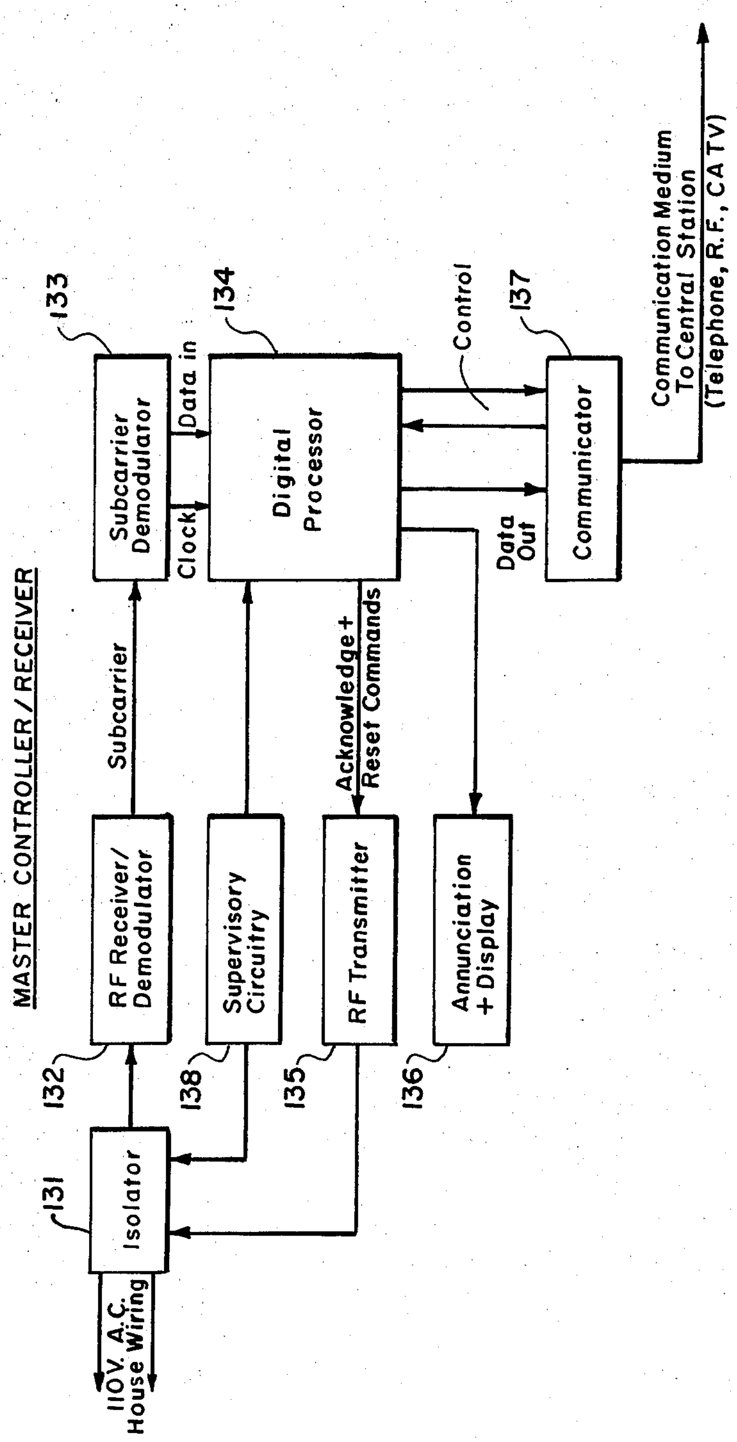
FIG. 21 shows in diagrammatic block form the functional specifics of the master controller in the embodiment of FIG. 1.

FIG. 21 shows, in block diagram form, the specific component elements of the master controller 13. An isolator 131 isolates the power-line voltage (e.g., 110 V. AC-60 cycle) circuit from the signal circuitry. The RF signal transmitted by a line converter (see FIG. 11) is sensed, amplified and demodulated by the RF receiver-demodulator 132 which delivers a subcarrier output that is further demodulated by the subcarrier demodulator 133. The data output from this demodulator 133 is fed into a digital processor 134 to be processed, analyzed and stored. Upon completion of the processing, a reset command is sent to the RF transmitter 135 which transmits an acknowledge and reset signal to the transmitting line relay receiver. Local decoding either fully or partially may be performed by the digital processor 134 and results displayed and/or announced by the annunciation and display device 136, such as bell, siren, print out and the like. In addition, commands to remote devices may be sent by means of transmitter 135. In addition, these information/data and the master controller identification and status code may be relayed/transmitted to a central station, for example, central station 15 in FIG. 1, by means of a communicator 137 through any one of various communication media, such as telephone, radio, coaxial cable, high-voltage power line and the like. The digital processor 134 may be similar to the digital processor 52 shown in FIG. 14 but arranged for handling the identification and status codes of the sensors and the line converters. If desired, a more sophisticated digital processor may be employed involving a micro-computer system.

Figure 22:
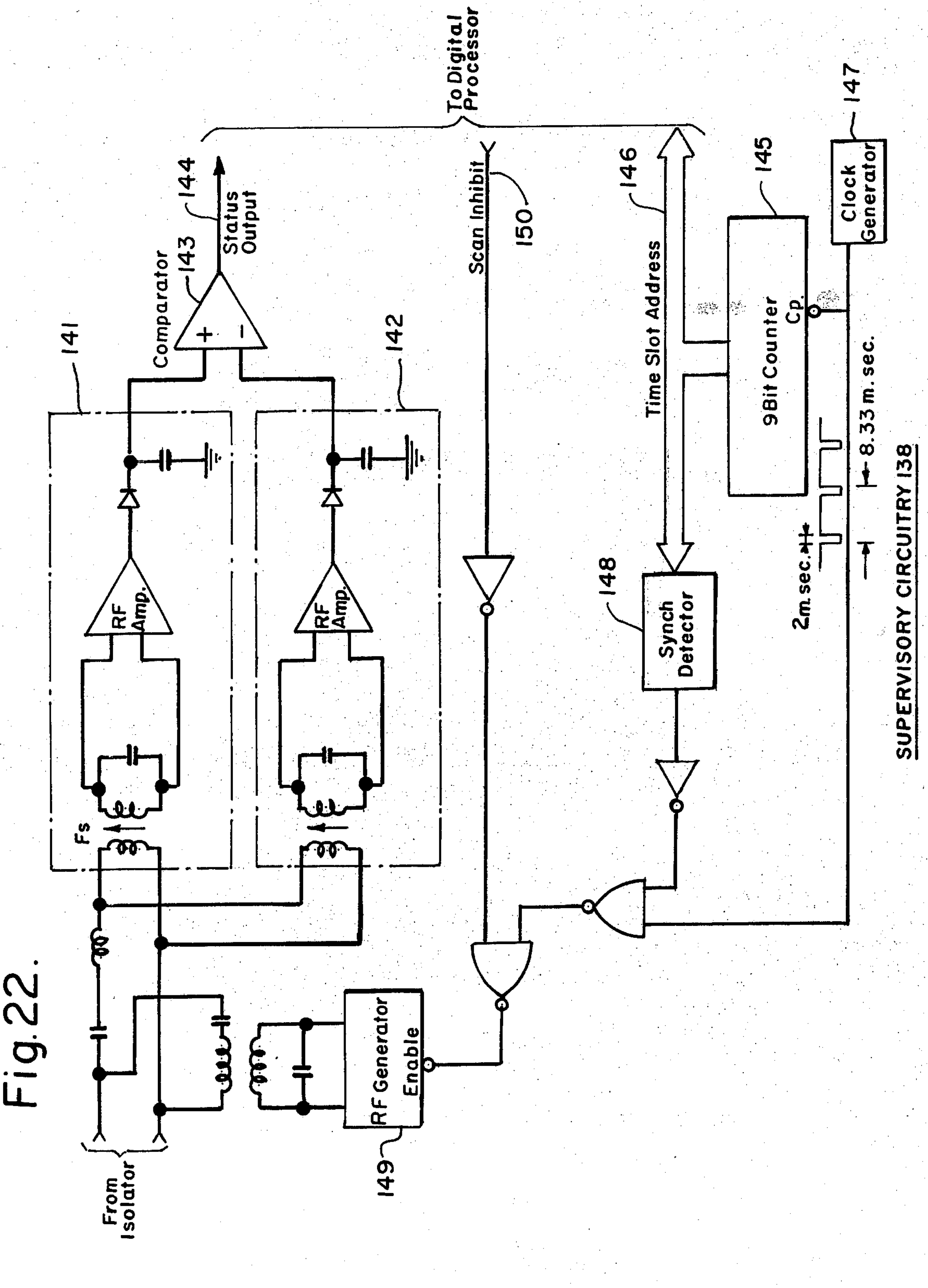
FIG. 22 shows an embodiment of the circuitry used in the master controller of FIG. 21 for the full supervision of the line converters and the power lines, utilizing timedivision multiplexing.

The supervisory circuitry 138, interposed between the digital processor 134 and the isolator 131, serves to detect malfunctioned or disconnected line converters or other remote devices utilizing the power-line circuitry as a signal communication means. Details of the supervisory circuitry 138 are shown in FIG. 22 and will now be briefly described. A tuned RF amplifier detector 141 detects signals sent by a responding line converter or other remote device and tuned to frequency F*s*. A second tuned amplifier detector 142 is tuned slightly off F*s* and the outputs of the two amplifier detectors (141, 142) are fed into a comparator 143. Any noise pulses or signals which are broad band in nature will appear on both outputs and will cancel each other. A signal sent by a device under a noisy condition will appear in the output of amplifier detector 141 slightly above the output of amplifier detector 142, and the difference in outputs will be detected by the comparator 143. The output 144 of the comparator is sent to the digital processor (see 134 of FIG. 21) to be evaluated along with the time slot indicated by counter 145 which appears as an 8-bit address 146.

Counter 145 is incremented by a 120 cycle clock generator 147. Synch detector 148 detects the condition when the counter indicates time slot zero. RF generator 149 is gated in such a way that during a syunch pulse or when the clock generator 147 is low for approximately 2 milliseconds, the RF generator is turned off. However, upon command from the digital processor (134 in FIG. 21) presented at the scan inhibit input 150, the RF generator remains turned on regardless of the conditions of the synch detector 148 or clock generator 147. The scan inhibit is used when the master controller requests that the message stored in a device, such as a line converter, be transmitted for decoding at the master controller.

Figure 23:
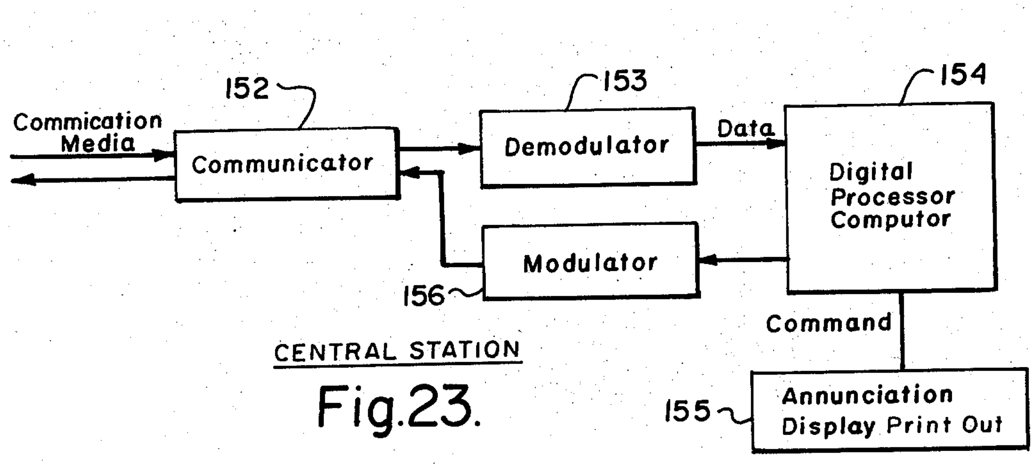
FIG. 23 shows in diagrammatic block form the specifics of the equipment provided in the central station of the embodiment of security system shown in FIG. 1.

FIG. 23 shows, in diagrammatic block form, the essential components of the central station (e.g., 15 of FIG. 1). The apparatus comprises a communicator module 152 which receives and transmits message signals from and to a master controller. From the communicator module 152, the digital signal is transmitted to a demodulator 153, which extracts the digital message to be processed, analyzed, decoded and stored by the digital processor/computer 154. The messages are decoded into the identification code of the sensor, type of emergency, line converter identification code and status and the master controller identification code and status. These are displayed or printed out on the annunciation device 155. Commands may in turn be sent to the master controller through the modulator 156 and communicator 152.

While we have shown and described herein a preferred embodiment and several alternative embodiments of a security system, it will be seen that modifications may be made within the terms of the following claims.

We claim:

1. A security system for a given security area, said system comprising:
a. security breach detecting means actuable responsively to occurrence of a breach condition within said area,
b. a sensor for encoding and transmitting self-identification signals responsively to actuation of said breach detecting means,
c. communication means comprising two lines of a secondary power distribution system of which at least one line is a phase line,
d. line converter means connected between said two lines of the secondary power distribution system, said converter means receiving said coded signals, adding its own self-identification code thereto, and transmitting the resulting synthesized line converter signal at radio frequencies along said two lines, and
e. master controller means comprising:
i. receiver means coupled to said two lines for receiving line converter signals and decoding a plurality of trains of coded line converter messages,
ii. variable memory means coupled to said receiver means for storing a plurality of said coded line converter messages,
iii. receiver memory means coupled to said receiver means for identifying the nature of the transmission mode of each line converter signal received by said receiver means, and
iv. status memory means coupled to said variable memory means and said receiver memory means for synthesizing a status message from said coded line converter messages, the nature of the transmission mode of each of the line converter signals received and the status of the said security system including said master controller.

2. A security system for a given security area, said system comprising:
a. security breach detecting means actuable responsively to occurrence of a breach condition within said area,
b. a sensor for encoding and transmitting self-identification signals responsive to actuation of said breach detecting means,
c. internal communication means limited to said given security area, comprising two lines of a secondary power distribution system of which at least one line is a phase line,
d. line converter means connected between said two lines of the secondary power distribution system, said converter means receiving said coded signals, adding its own self-identification code thereto, and transmitting the resulting synthesized line converter signal at radio frequencies along said two lines,
e. communication means extending externally from said security area,
f. a plurality of master controller means each comprising line receiver means connected between said two lines of the secondary power distribution system, means for decoding and registering said synthesized line converter signals, and communicator means coupled to said externally extending communication means, for transmission of information beyond said given security area, and
g. central station means outside said given security area comprising:
i. central station receiving means connected to said externally extending communication means for receiving communication signals from any one of said plurality of master controllers along said externally extending communication means,
ii. central station means for decoding and registering signals received from a plurality of said master controllers,
iii. central station transmission means for transmitting coded messages and signals back to a plurality of master controllers along said externally communication means, for the remote control of functions and for the remote registration of the status of the security system,
iv. central station storage means for storing a plurality of signals received from a plurality of master controllers,
v. central station message checking means for examining all received signals for consistency in the information conveyed by each coded message within the signal, thereby requiring a continuous reception of messages and signals from each master controller that is in communication with said central station until the message-checking procedure reveals that the quality of information received is above a predetermined fixed level; and
vi. central station interpreter means, for interpreting a plurality of conditions of security breach and a plurality of status conditions transmitted by a plurality of said master controllers connected to said central station means.

3. A security system according to claim 2, wherein said central stations means further comprises:
a. central station audible alarm means coupled to said central station receiving means, for alerting the operators manning said central station means to the arrival of a plurality of messages from a plurality of master controllers, and
b. central station display means for the display of a plurality of coded sensor messages, coded line converter messages, and other coded messages.

4. A security system for a given security area, such system comprising:
a. security breach detecting means actuable responsively to occurrence of a breach condition,
b. a sensor for encoding and transmitting selfidentification signals responsively to actuation of said detecting means,
c. communication means comprising two lines of a secondary power distribution system of which at least one line is a phase line,
d. line converter means connected between said two lines of the secondary power distribution system, said converter means receiving coded signals, transmitted by said sensor, adding its own self-identification code thereto, and transmitting the resulting synthesized line converter signal at radio frequencies along said two lines and
e. master controller means comprising line receiver means connected between said two lines of the secondary power distribution system, and means for decoding and registering said synthesized line converter signals.

5. A security system according to claim 4, wherein said sensor comprises:
a. sensor triggering means coupled to said security breach detecting means, for triggering and activating the entire circuitry of the sensor means for predetermined periods of time following detection of a security breach by said breach detecting means,
b. memory means for storing digital information to provide self-identification of said sensor means,
c. message means coupled to said memory means for synthesizing a coded sensor message from the self-identification digital information,
d. message timer-counter means coupled to said message means for repeating said coded sensor messages periodically for said predetermined periods of time, thereby generating a train of said coded sensor messages; and
e. transmission means coupled to said message means and message repeating means for converting said train of coded sensor messages into a modulated signal with a predetermined carrier frequency suitable for transmission by radiation.

6. A security system for a given security area, said system comprising:
a. security breach detecting means actuable responsively to occurrence of any one of a plurality of breach conditions,
b. a sensor for encoding and transmitting self-identification signals responsive to actuation of said detecting means,
c. a first communication means within said security area comprising two lines of a secondary power distribution system of which at least one line is a phase line,
d. line converter means connected between said two lines of the secondary power distribution system, said converter means receiving said coded signals, adding its own self-identification code thereto, and transmitting the resulting synthesized line converter signal at radio frequencies along said two lines,
e. a second communication means extending externally from said security area,
f. master controller means comprising the receiver means connected between said two lines of the secondary power distribution system, means for decoding and registering said synthesized line converter signals, and communicator means coupled to said external extending communication means, for transmission of information beyond said security area, and
g. central station means outside said security area comprising communicator means coupled to said externally extending communication means, and means for decoding and registering signals received from said master controller means.

7. A security system according to claim 4, wherein supervisory circuitry partly in said line converter and partly in said master controller automatically detects any breach in communication via said secondary power distribution system and registers same at the master controller.

8. A security system according to claim 4, in which said line converter means comprises:
a. converter receiver means for receiving and demodulating sensor signals of predetermined carrier frequency from said sensor,
b. converter memory and digital processor means coupled to said converter receiver means, for discriminating, extracting and storing a train of coded sensor messages, for storing a converter self-identification code for said line converter, and for synthesizing a train of coded line converter messages from said train of coded sensor messages and said converter self-identification code, and
c. converter transmission means coupled to said converter memory and digital processor means for converting said train of coded line converter messages into a modulated line converter signal with a predetermined carrier frequency suitable for transmission on said two lines of the secondary power distribution system.

9. A security system according to claim 8, in which said line converter means additionally comprises means to prevent a plurality of line converters from communicating simultaneously with the same master controller, thereby eliminating possible interference in communication.

10. A security system according to claim 4, wherein said master controller further comprises:
a. supervisory circuitry means for automatically detecting and registering any breach in communication between said line converter means and said master controller means via said two lines of the secondary power distribution system.

* * * * *